Patented Apr. 28, 1936

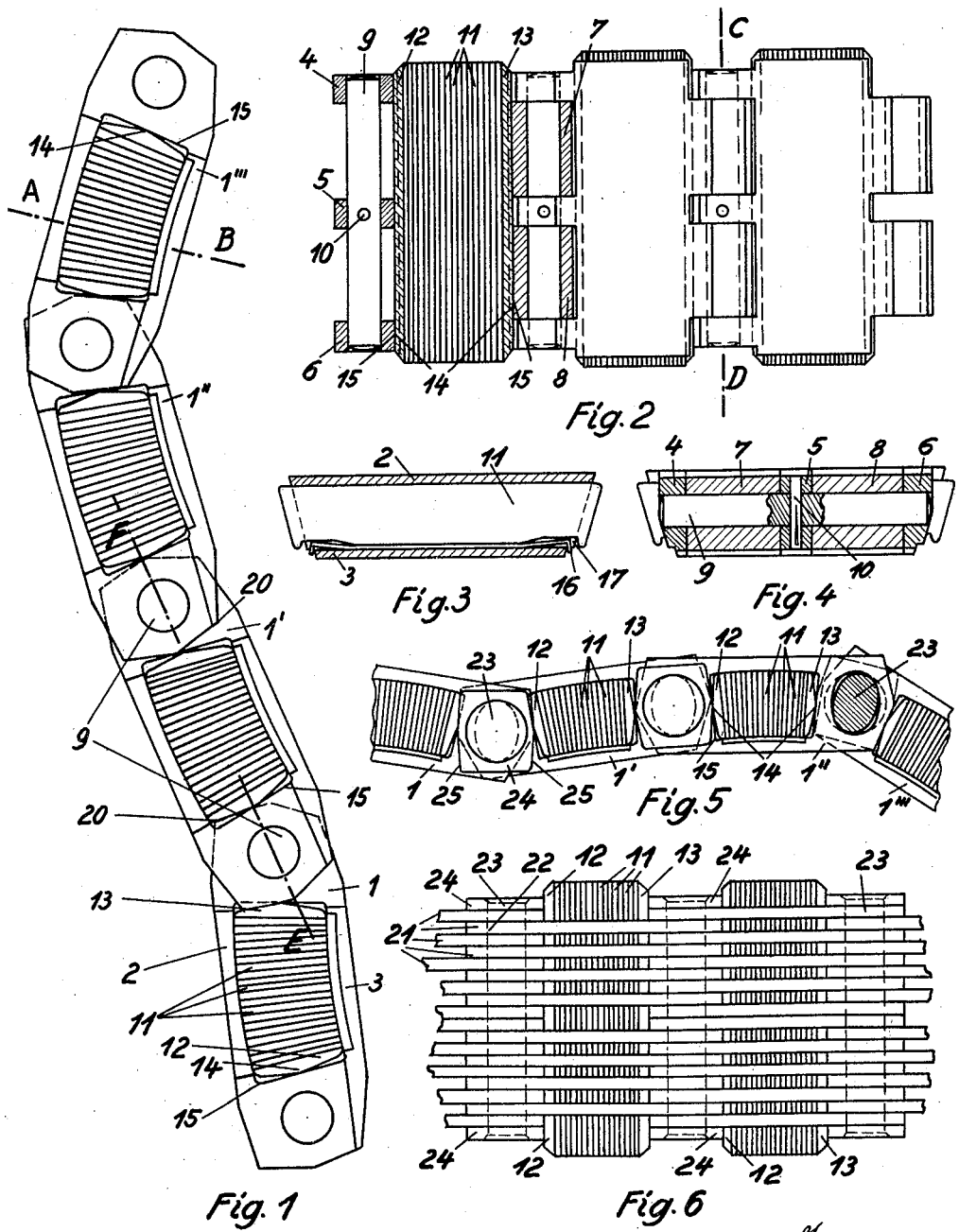

2,038,583

UNITED STATES PATENT OFFICE 2,038,583

POWER TRANSMITTING CHAIN

Albrecht Maurer, Bad Homburg vor der Hohe, Germany, assignor to P. J. V. Ketten & Getriebe G. m. b. H., Bad Homburg vor der Hohe, Germany Application March 12, 1934, Serial No. 715,239
In Germany March 16, 1933

6 Claims. (Cl. 74—236)

My invention relates to power transmitting chains and more especially to chains of the kind in which groups of plates or laminae movably inserted in the links of the chain are displaceable transversely to the direction of travel of the chain forming teeth adapted to engage the teeth of power transmission wheels or discs. The plates, when brought in contact with a tooth of one such wheel, are in positive engagement with the latter, so that the power is transmitted without slip. Each link comprises a group of laminae, the end plates of which transmit the power to the frame of the link proper.

In the chains as hitherto designed which are shown and described for instance in the specification of Letters Patent No. 1,601,663, the laminae are arranged in a cage and the end plates are formed with curved rear faces abutting against correspondingly curved side walls of the cage. Obviously these end plates must be supported near their ends in order to be enabled to resist the high bending and shearing stresses.

These chains involve the following drawbacks, particularly if subjected to severe stresses or operated at high speeds. The pitch of the chain, being the sum of the length of the group of plates plus double the thickness of an end plate plus double the thickness of the wall of the cage plus double the thickness of the wall of the link plus the diameter of the linking bolt, is too high. The heavy semi-cylindrical end plates strike the teeth of the wheels so heavily as to damage them. When the angle between two consecutive links changes, for instance when the chain enters one of the power transmission wheels, great forces are required to bring the semi-cylindrical end plates into correct position in view of the friction arising between the rear faces of the end plates and the faces of the cage supporting them. If the chains have been in operation for a longer period of time, the plates may become loose and assume an inclined position with respect to the cage, so that they do not correctly engage the wheels.

In order to reduce the pitch of the chain, it has been suggested to support only a part of the circumference of the semi-cylindrical end plates on the correspondingly curved supporting faces and to connect these supporting faces to the casing or to the links by means of straight tangentially extending members. However, by this expedient the length of the links is merely reduced to a small extent, since the end plates are still too thick and the friction is not reduced at all.

In order to avoid these drawbacks, I replace the semi-cylindrical end plates by plates which are enabled to perform practically frictionless rocking movements with respect to the supporting faces. In a preferred embodiment of my invention the end plates are so shaped that their cross section resembles a substantially triangular or pentagonal roof abutting with its middle edge against the supporting face, for instance the link of the chain.

In order to facilitate engagement between the plates and the wheels or discs, I provide means for automatically changing the inclination of the end plates relative to the links whenever the angle enclosed between consecutive links is changed. This may be accomplished by forming the links, or the bolts linking them together, with suitable projections which are in contact with the rear faces of the roof-shaped end plates. If the projections are provided on the linking bolts the latter should be shaped in such manner that their plane of symmetry always coincides with the middle plane subdividing the angle between the links connected by the bolts. This can be done for instance by providing linking bolts having an oval cross section.

In a chain according to my invention no separate cages for the plates are required. This together with the flatter end plates acts towards considerably reducing the pitch of the chain so that the number of links in engagement with the wheels and consequently also the power transmitted by the chain are increased correspondingly. The wear in the links is reduced since the relative angular position of consecutive links need not be changed to the same extent as in similar chains hitherto known.

In order to facilitate the mounting of the plates in the links the height of the plates is preferably not larger than the height of the apertures in the links. In order to limit the transverse displacements of the plates a leaf spring is arranged at the bottom of each aperture, this spring being flattened, when inserting and withdrawing the plates, and holding the plates in position by engaging suitable recesses provided in the plates.

Chain links according to my invention may be made in one piece or they may be formed of a plurality of stamped plates arranged parallel to each other.

In the drawing affixed to this specification and forming part thereof two embodiments of my invention are illustrated diagrammatically by way of example.

In the drawing

Fig. 1 is a side elevation of part of a chain, while

Fig. 2 is a plan view partly in section on the line E—F in Fig. 1, and

Figs. 3 and 4 are sections on the lines A—B of Fig. 1, and C—D of Fig. 2, respectively.

Figs. 5 and 6 are a side elevation and a plan view, respectively, of the second embodiment.

Referring first to Figs. 1 to 4, 1, 1', 1'' are apertured box-shaped links, each forming a frame with a top-member 2 and a bottom member 3. Consecutive links are interconnected by means of eyes 4, 5, 6, and eyes 7, 8, respectively, through which extends a bolt 9, which is secured to the eye 5 by a pin 10, being thus rendered immovable with respect to the eyes 4, 5, 6, but capable of moving relative to the eyes 7 and 8.

11 are bundles of laminae arranged in the apertures of the links, the end plates 12, 13 of each bundle being thicker than the rest and formed with a cross section resembling a flat roof. The middle edge 14 of each end plate abuts against faces 15 formed on the eyes. In order to limit the transverse displacements of the laminae, a leaf spring 16 is provided in each link, being held therein by means of its bent ends and engaging suitable recesses 17 formed in the laminae.

The laminae when coming into engagement with a counter member, for instance with the teeth of a bevel disc, are radially adjusted and inclined with respect to each other in a manner corresponding to the pitch circle of the gearing. A suitable inclination is imparted to the plates in consequence of the rocking movement imparted to the links corresponding to the pitch circle of the gearing by cooperation of the end plates with the edges formed on the eyes of the adjoining link. As can be guessed from Fig. 1, the eyes are formed with edges 20 acting on the end plate of the adjoining link so as to change the inclination of the end plate. Thus for instance the links 1'' and 1''' in Fig. 1 are shown to extend at an angle with respect to each other and correspondingly the end plates in these links which adjoin the linking bolt are adjusted by the pressure exerted on them by the edges of the eyes. In contradistinction thereto the links 1' and 1'' being practically in alignment the edges 20 formed at their eyes do not contact with the adjoining end plates. Again the links 1 and 1' extend at an angle to each other, but in opposite sense as the links 1'' and 1'''. The edges 20 of their eyes engage the adjoining end plates in such manner that these end plates are inclined in a sense opposite to the end plates of links 1'' and 1'''.

The operation of this chain is as follows:

In running between two counter members, for instance toothed bevel discs, the laminae of each link are displaced transversely in such manner as to form teeth for positively engaging the counter members, in the same manner as in the old chains. The laminae are adjusted into an inclined position relative to the plane of travel of the links in correspondence to the pitch circle of the disc. This adjustment can be carried out easily, since the end plates abut practically without friction against their supporting faces. The correct inclination of the laminae is started by the end plates being rocked in the manner described above by the rocking movements of the links with respect to each other.

Referring now to Figs. 5 and 6, the construction and operation of the chain here shown is substantially the same as those of the chain illustrated in Figs. 1 to 4, except that the edges which act on the end plates, are formed on the linking bolts. Here the links are formed of a plurality of apertured plates 21, each being formed with end perforations 22 for the insertion of the connecting bolt 23, which is secured therein by means of end discs 24. The laminae 11 and the end plates 12 and 13 are formed in the same manner as in Figs. 1 to 4, the plates abutting with their edges 14 against supporting faces 15 formed on the ends of the link plates 21. In order to adjust the end plates to suitable inclinations when consecutive members form an angle between them, the end discs 24 which may be secured to the link 23, for instance by riveting, are formed with faces 25 cooperating with the end plates in such manner that the latter are rocked whenever the faces 25 assume an inclined position with respect to the longitudinal axis of the link. The cross section of the bolts 23 is oval so that the thrust exerted on the chain automatically adjusts the bolts in such manner that their plane of symmetry always coincides with the mid-plane subdividing the angle between consecutive links. In consequence thereof the mid lines of the end discs 24 also subdivide these angles, so that the faces 25 do not adjust the end plates when the corresponding links are in alignment and impart suitable inclinations to the end plates when consecutive links are inclined with respect to each other.

I wish it to be understood that I do not desire to be limited to the exact details of construction shown and described for obvious modifications will occur to a person skilled in the art.

I claim:—

1. A power transmitting chain comprising two links connected to each other, each link comprising a frame, a group of laminae arranged in said frame for transverse displacement, an end plate forming part of said group and abutting with its rear face against said frame, said end plate being so shaped as to be enabled to perform rocking movements with respect to said frame, and means connected with one of said links for imparting a rocking movement to the end plate of the other link.

2. A power transmitting chain comprising two links connected to each other, each link comprising a frame, a group of laminae arranged in said frame for transverse displacement, an end plate forming part of said group and abutting with its rear face against said frame, said end plate being so shaped as to be enabled to perform rocking movements with respect to said frame, and eyes forming part of said frames, the eyes of one link being formed to contact with the end plate of the adjoining link.

3. A power transmitting chain comprising two links, each comprising a frame, a group of laminae arranged in said frame for transverse displacement and an end plate forming part of said group, a bolt linking said links to each other, and a projection on said bolt arranged to contact and to impart rocking movements to said end plates when said links are angularly displaced with respect to each other.

4. A power transmitting chain comprising two links, each comprising a frame, a group of laminae arranged in said frame for transverse displacement, an end plate forming part of said group, a bolt linking said links to each other, means for automatically adjusting said bolt with its plane of symmetry in the direction of the mid-plane subdividing the angle between said members in equal parts, and a projection on said bolt arranged to contact and to impart rocking movements to said end plates when said links are angularly displaced with respect to each other.

5. A power transmitting chain comprising two links, each comprising a frame, a group of laminæ arranged in said frame for transverse displacement and an end plate forming part of said group, a bolt of oval cross section linking said links to each other, and a projection formed on said bolt and arranged to contact and to impart rocking movements to said end plates when said links are displaced angularly with respect to each other.

6. A power transmitting chain comprising two links, each comprising a frame, a group of laminæ arranged in said frame for transverse displacement, an end plate forming part of said group, a leaf spring in said frame adapted to limit the transverse displacements of said plates, a bolt connecting said links, and a projection on said bolt arranged to contact and to impart rocking movements to said end plates when said links are angularly displaced with respect to each other.

ALBRECHT MAURER.